US005904941A

United States Patent [19]

Xu et al.

[11] Patent Number: 5,904,941

[45] Date of Patent: May 18, 1999

[54] USE OF ENZYMATICALLY-TREATED STARCHES AS VISCOSIFIERS AND THEIR USE IN FOOD PRODUCTS

[75] Inventors: Zu-Feng Xu, Newark, Del.; Jamie L. Senkeleski, Neshanic Station, N.J.; James P. Zallie, Singapore, Singapore; Peter J. Hendrikx, Venningen, Germany

[73] Assignee: National Starch and Chemical Investment Holding Corporation, Bridgewater, N.J.

[21] Appl. No.: 08/918,515

[22] Filed: Aug. 21, 1997

[51] Int. Cl.[6] .............................. A23B 7/10; A21D 10/00; C08B 30/12

[52] U.S. Cl. ............................ 426/52; 426/439; 426/465; 426/549; 426/550; 426/622; 426/661; 127/32; 127/33; 127/36; 127/71

[58] Field of Search .............................. 426/52, 549, 550, 426/439, 465, 661, 622; 127/32, 33, 36, 71

[56] References Cited

U.S. PATENT DOCUMENTS

| | | | |
|---|---|---|---|
| 3,644,126 | 2/1972 | Bodnar et al. | 99/142 |
| 3,922,196 | 11/1975 | Leach et al. | 195/31 R |
| 3,922,200 | 11/1975 | Walon et al. | 195/31 |
| 4,612,284 | 9/1986 | Pickens et al. | 435/96 |
| 5,445,950 | 8/1995 | Kobayashi et al. | 435/99 |
| 5,641,349 | 6/1997 | Koubek et al. | 106/206.1 |
| 5,688,845 | 11/1997 | Eden et al. | 524/48 |
| 5,718,770 | 2/1998 | Shah et al. | 127/65 |
| 5,720,822 | 2/1998 | Jeffcoat et al. | 127/65 |
| 5,725,676 | 3/1998 | Chiu et al. | 127/34 |
| 5,795,397 | 8/1998 | Shi et al. | 127/29 |

FOREIGN PATENT DOCUMENTS

| | | |
|---|---|---|
| 0 182 296 A2 | 5/1986 | European Pat. Off. . |
| 0 704 169 A2 | 4/1996 | European Pat. Off. . |
| WO 96/03892 | 2/1996 | WIPO . |
| WO 96/04315 | 2/1996 | WIPO . |

OTHER PUBLICATIONS

"Glucose Syrups", Food Review—Dec. 1992/Jan. 1993, p. 33.

*Primary Examiner*—Nina Bhat
*Attorney, Agent, or Firm*—Karen G. Kaiser

[57] ABSTRACT

The present invention is directed to a viscosifier prepared by enzymatically hydrolyzing a ungelatinized, granular starch or flour. Such starch or flour is useful as an ingredient in food products, particularly fruit- or vegetable-based products, as a viscosifier and may be used to replace pectin or tomato solids.

17 Claims, No Drawings

USE OF ENZYMATICALLY-TREATED STARCHES AS VISCOSIFIERS AND THEIR USE IN FOOD PRODUCTS

BACKGROUND OF THE INVENTION

The present invention relates to enzymatically-treated starches which are useful as viscosifiers and to a process for their preparation. Such starch-based viscosifiers are useful in the preparation of food products, particularly fruit and vegetable based products.

Numerous starch products prepared using a variety of processes are known in the art. These include starches which are prepared by enzymatic treatment.

Enzymatic treatment of starches has also been disclosed in the art. U.S. Pat. No. 3,644,126 discloses a method of liquefying a starch slurry using α-amylase and then malt enzymes and glucoamylase to make a highly fermentable starch conversion syrup with a DE less than 35. U.S. Pat. No. 3,922,196 discloses solubilization of a granular starch to essentially dextrose using α-amylase. U.S. Pat. No. 5,445,950 discloses a method of using α-amylase to prepare slightly decomposed, low viscosity starch granules with a DE preferably between 0.1 and 1.0 to produce a material useful as a raw material in the sugar industry.

EP 182 296 discloses a granular α-amylase hydrolyzed starch for use as a dusting powder. EP 231 729 discloses a gelatinized starch hydrolyzate useful as a sweetener in foods which is prepared using α- and β-amylase in a two-step process. EP 704 169 discloses partially gelatinized starch which is hydrolyzed to a DE of preferably between 4 and 10 for use as a fat or oil substitute.

The use of glucose syrups in a variety of foods, including ketchup, jams, marmalades and fruit preparations, has been reported in Food Review, 19(6): 33 (1993). Glucose syrups are purified, concentrated aqueous solutions of nutritive saccharides of DE 20 or more obtained by hydrolysis of edible starch. See Whistler, et al., *Starch Chemistry and Technology*, 2nd Ed., Academic Press, Inc. Orlando, pp. 612 (1984). Further, glucose syrups known in the art do not add viscosity to food products. They are primarily added to provide or balance sweetness, as a bulking agent or filler, and to enhance Maillard browning.

Surprisingly, it has now been discovered that enzyme hydrolysis of a non-gelatinized, granular starch or flour produces unique starches useful as viscosifiers in food products, particularly fruit- or vegetable-based products.

SUMMARY OF THE INVENTION

The present invention is directed to an enzymatically hydrolyzed, ungelatinized, granular starch or flour viscosifier and the process of making such starch or flour. Such starch or flour is useful as an ingredient in food products, particularly fruit- or vegetable-based products.

An object of the present invention is to provide an enzymatically hydrolyzed, ungelatinized, granular starch or flour viscosifier.

Another object of the present invention is to provide a method of preparing an enzymatically hydrolyzed, ungelatinized, granular starch or flour viscosifier.

Still another object of the present invention is to provide a food product containing an enzymatically hydrolyzed, ungelatinized, granular starch or flour, particularly a fruit- or vegetable-based food product.

A further object of the present invention is to provide a fruit-based product in which at least a portion of the pectin has been replaced by an enzymatically hydrolyzed, ungelatinized, granular starch or flour.

A still further object of the present invention is to provide a tomato-based product in which a portion of the tomato solids have been replaced by an enzymatically hydrolyzed, ungelatinized, granular starch or flour.

These and other objects of the present invention will become apparent to one skilled in the art from the following detailed description and examples below.

DETAILED DESCRIPTION OF THE INVENTION

The present invention is directed to an enzymatically hydrolyzed, ungelatinized, granular starch or flour and the process of making such starch or flour viscosifier. Such starch or flour is useful as an ingredient in food products, particularly fruit- or vegetable-based products.

All starches and flours are suitable for use herein and may be derived from any native source. A native starch or flour, as used herein, is one as it is found in nature. Typical sources for the starches and flours are cereals, tubers, roots, legumes and fruits. The native source can be corn, pea, potato, sweet potato, banana, barley, wheat, rice sago, amaranth, tapioca, arrowroot, canna, sorghum, and waxy or high amylose varieties thereof. As used herein, the term "waxy" is intended to include a starch or flour containing at least about 95% by weight amylopectin and the term "high amylose" is intended to include a starch or flour containing at least about 45% by weight amylose. In particular, maize, waxy maize, potato, and tapioca, more particularly maize and tapioca, are useful in the instant invention.

The starch or flour is enzymatically hydrolyzed by at least one amylase capable of digesting granular starch at significant rates, particularly α-amylase, glucoamylase, or maltogenase, using techniques known in the art. The enzyme must be capable of cleaving the alpha-D-glucosidic linkages of the starch in a granular state. The amount of enzyme is dependent upon the enzyme, i.e., type, source and activity, and base material used as well as the amount of hydrolysis desired. Typically, the enzyme is used in an amount of from about 0.1 to about 1.0% by weight of the starch. For example, 0.2 to 0.6% glucoamylase (AMG-300 L commercially available from Novo Nordisk) has been found to be effective in the instant invention.

An acid and/or heat treatment may be used before enzyme hydrolysis to loosen the integrity of the starch granule, allowing the enzyme to more readily hydrolyze the starch. This is particularly useful when the base material is derived from potato as potato starch granules tend to be particularly smooth, compact, and dense, more so than most other types of starch granules, and thus more resistant to amylolytic enzyme activity.

Generally the enzyme treatment is carried out in an aqueous or buffered slurry at a starch solids level of about 10 to about 40%, depending upon the base starch being treated. A solids level of from about 15 to 35% is particularly useful, from about 18 to 23% more particularly useful, in the instant invention.

The pH and temperature of the slurry should be adjusted to provide effective enzyme hydrolysis. These parameters are dependent upon the enzyme to be used and are known in the art. In general, a temperature of about 22 to about 65° C. is used, particularly from about 50 to about 62° C. The temperature should be kept below the gelatinization temperature, particularly about 5° C. below the gelatinization temperature of the base starch material so as to maintain the starch in the granular state. In general, the pH is adjusted to about 3.5 to about 7.5, particularly from about 4.0 to about 6.0, using techniques known in the art.

The enzyme reaction is continued until a dextrose equivalent of at least about 5 and up to about 60, particularly about 15 to about 35, more particularly about 20 to about 30, has been achieved, or until the desired end point (i.e., sufficient degradation to provide the desired functionality for the particular application) has been reached. The end point may be determined by a change in viscosity, by reducing sugar content, or by any other method known in the art for measuring the level of enzyme degradation of the starch molecule. In general, the enzyme reaction will take from about 0.1 to about 24 hours, particularly about 0.5 to about 4 hours. The time of the reaction is dependent upon the type of starch and enzyme used, the amount of enzyme used, and the reaction parameters of solids percent, pH, and temperature.

Dextrose equivalent (DE) is defined as the reducing power of the hydrolyzate. Each starch molecule has one reducing end; therefore DE is inversely related to molecular weight. The DE of anhydrous D-glucose is defined as 100 and the DE of unhydrolyzed starch is virtually zero.

The enzyme degradation is then terminated by acid deactivation as known in the art, particularly by adjusting the pH to greater than about 9.0 at a temperature greater than about 55° C. for at least 30 minutes. In the alternative, the enzyme degradation may be terminated by heat deactivation as known in the art, particularly by raising the temperature to about 85 to about 95° C. and maintaining it at that temperature for at least about 10 minutes to fully deactivate the enzyme. Heat deactivation is not suitable if a granular product is desired as the heat necessary to deactivate the enzyme will generally also gelatinize the starch.

The resultant slurry is typically adjusted to the desired pH according to its intended end use. In general, the pH is adjusted to from about 5.0 to about 7.5, particularly from about 6.0 to about 7.0, using techniques known in the art.

The resultant starch (hydrolysate) may be used directly in liquid form. Alternatively, the resultant starch may be recovered in powdered form by conventional techniques known in the art, including drum drying, freeze drying, and spray drying with or without gelatinization. Gelatinization may be desirable in some applications, for example, in instant products and/or products in which the starch is not cooked out.

The resulting starch is characterized by a relatively high viscosity, moderate cohesiveness or gel strength, short texture, excellent water holding ability, neutral taste, and by its unique functionality in food products, particularly fruit or vegetable based food products. Further, the resulting starch may provide many of the attributes of a lightly cross-linked starch.

The viscosity of the present starches at 5% solids is generally from about 25 to about 1000 cps, particularly from about 30 to about 900 cps. The hot peak viscosity range is particularly from about 50 to about 900 cps, more particularly from about 50 to about 500 cps, and the cool peak viscosity range is particularly from about 30 to about 350 cps, more particularly from about 50 to about 300 cps.

The resultant starches may be used at any level desired in food products, the amount being dependent upon its desired viscosity. In general, the starch will be used in an amount of from about 0.01 to about 10%, particularly from about 0.1 to about 5% by weight of the food product. Viscosity may be provided by the addition of about 0.5% or more by weight of the food product.

The resultant starch can be used in various food products including, but not limited to, fruit preps; jellies, jams, and marmalades; pie fillings, including fruit and cream fillings; dressings, including sauces, including tomato-based sauces, white sauces, and dairy-based sauces such as cheese sauces; condiments such as ketchup, salsa, and barbecue sauce; pourable dressings and spoonable dressings, including mayonnaise; gravies; lite syrups; puddings; custards; yogurts; beverages, including dairy-based beverages; glazes; soups; shortenings, including margarines; processed meats; tofu; and baby foods.

The resultant starches are particularly useful in fruit-based food products, particularly when a starch is desired which is relatively easy to cook out at high solids, provides a short texture, controls moisture migration, has a clean flavor, and/or provides a relatively low hot viscosity during processing. For example, the resultant starches may be used in fruit preps, jams, jellies, and fruit fillings to reduce the amount of pectin or even replace it in total without a loss in viscosity. In particular, the starches are useful in fruit-based products which have a high solids content, such as fruit preps, but are also useful in low solids systems such as low/no sugar fruit preps. When fruit preps using the resultant starches are used in yogurts, the interface that occurs between the fruit and the white mass is significantly reduced, the stir-down and mouth-feel are improved to create a smoother yogurt, the color bleed from the fruit into the white mass is reduced, and the water capacity is improved resulting in reduced syneresis upon storage.

The resultant starches are also particularly useful in vegetable-based food products, particularly when a starch is desired which has a relatively high viscosity, has a clean flavor, and/or prevents serum separation. For example, the resultant starches may be used in tomato-based products such as ketchup, barbecue sauce, tomato sauce, and salsa to reduce the amount of tomato solids without loss of viscosity or texture and add a pulpiness that is often desired. Further, in ketchup and in barbecue and tomato sauce, use of the resultant starches reduces serum separation during storage, thus improving the overall quality of the product.

The starches may be used to prepare tomato paste using either hot or cold break processes. "Hot break," as used herein, is intended to describe the process of preparing tomato paste from fresh tomatoes by using heat and mechanical shear to crush and homogenize the tomatoes. "Cold break," as used herein, is intended to describe the process of preparing tomato paste from fresh tomatoes by using only mechanical force to crush fresh tomatoes at mild temperatures. Cold break tomato paste requires a higher level of tomato solids to provide similar viscosity to hot break tomato paste. However, the cold break process provides better tomato flavor and color. The present starches may be used to replace at least a portion of the tomato solids in either type of tomato paste, compensating for the loss in viscosity and controlling serum separation without the undesirable cohesiveness, gelling, or starchy taste generally provided by other starches.

EXAMPLES

The following examples are presented to further illustrate and explain the present invention and should not be taken as limiting in any regard.

Measurement of the Net Sugar Concentration

The net sugar concentration in the examples, when measured using a refractometer, was determined using the following procedure.

1.5 ml of the slurry was withdrawn using a Pasteur pipet and placed into a 1.8 ml Eppendorf tube. The tube was placed into a micro centrifuge and run at a speed of 8,000–10,000 rpm for 30–60 seconds. One drop of the clear supernatant was removed and placed on a calibrated refractometer (calibrated to zero using water). The concentration of the soluble supernatant was read.

Example 1

Starch Preparation a. 1.0 kg waxy corn starch at a moisture of 10.5% was slurried in 3 L of water and the pH was adjusted to 4.5 with dilute hydrochloric acid. 5 g of glucoamylase (AMG 300 L commercially available from Novo Nordisk) were added. The slurry was placed in a 55° C. water bath and allowed to react for five hours with constant stirring. The pH was adjusted to 9.5 using sodium hydroxide. The slurry was maintained at this pH and temperature for half an hour to deactivate the enzyme. The pH was then adjusted to 6.5 using dilute hydrochloric acid.

b. The slurry of Example 1a was spray dried used the following conditions:

| | |
|---|---|
| inlet temperature | 225° C. |
| outlet temperature | 100° C. |
| % solids | 20% |
| speed | 30–35 rpm |
| inlet tube diameter | ¼ inch |

Example 2

Variations on Starch Preparation a. 20 kg of waxy corn starch were slurried in 40 L of water and the pH was adjusted to 4.5 with dilute hydrochloric acid. 100 g (0.5% w/w) of glucoamylase (AMG 300 L) were added. The slurry was placed in a 55° C. water bath and allowed to react with constant stirring until the net sugar concentration as measured using a refractometer reached 6.9%. The pH was adjusted to 9.5 using 4% sodium hydroxide. The slurry was maintained at this pH and temperature for half an hour to deactivate the enzyme. The pH was then adjusted to 6.5 using dilute hydrochloric acid and spray dried using the procedure of Example 1b. The resultant starch had a dextrose equivalent of 23.2 and a moisture of 3.6%.

b. 20 kg of tapioca starch with a moisture of 12.2% were slurried in 40 L of water and the pH was adjusted to 4.5 with dilute hydrochloric acid. 120 g (0.6% w/w) of glucoamylase (AMG 300 L) were added. The slurry was placed in a 55° C. water bath and allowed to react with constant stirring. After 90 minutes, the pH was further adjusted to 4.0 using dilute hydrochloric acid and after 4 hours and 40 minutes, 40 g additional enzyme were added. The reaction was continued until the net sugar concentration as measured using a refractometer reached 8.7%. The pH was adjusted to 9.5 using 4% sodium hydroxide. The slurry was maintained at this pH and temperature for half an hour to deactivate the enzyme. The pH was then adjusted to 6.5 using dilute hydrochloric acid and spray dried using the procedure of Example 1b. The resultant starch had a dextrose equivalent of 21.0 and a moisture of 4.9%.

c. 4 kg of waxy corn starch were slurried in 10 L of water and the pH was adjusted to 5.0 with dilute hydrochloric acid. 40 g of maltogenase 4000 L (commercially available from Novo Nordisk) were added. The slurry was placed in a 60° C. water bath and allowed to react with continuous shaking until net sugar concentration as measured using a refractometer reached 11.5%. The pH was adjusted to 9.0 using 4% sodium hydroxide. The slurry was maintained at this pH and temperature for 30 minutes to deactivate the enzyme. The pH was then adjusted to 6.5 and spray dried as in Example 1b. The resultant starch had a DE of 20.6 and a percent moisture of 4.9%.

d. 100 g of corn starch with a moisture of 11% were slurried in water to 27% solids. The pH was adjusted to 4.2 with hydrochloric acid and the temperature was raised to 54° C. 0.30% glucoamylase AMG 300 L (commercially available from Novo Nordisk was added and allowed to react with constant stirring until the net sugar concentration indicated a DE of 23. The pH was adjusted to 9.2 using a 2% solution sodium hydroxide. The slurry was maintained at this pH and temperature for half an hour to deactivate the enzyme. The pH was then adjusted to 6.5 using a 25% solution of hydrochloric acid and spray dried using the procedure of Example 1b. The resultant starch had a DE of 23 and a percent moisture of 5%.

e. 5 kg of corn starch with a moisture of 10.5% were slurried in 10 L of water and the pH was adjusted to 4.5 with dilute hydrochloric acid. 5.0 g (0.10% w/w) of glucoamylase (AMG 300 L) were added. The slurry was placed in a 50° C. water bath and allowed to react with constant stirring until the net sugar concentration as measured using a refractometer reached 2.1%. The pH was adjusted to 9.5 using 4% sodium hydroxide. The slurry was maintained at this pH and temperature for half an hour to deactivate the enzyme. The pH was then adjusted to 6.5 using a 25% solution of hydrochloric acid and spray dried using the procedure of Example 1b. The resultant starch had a dextrose equivalent of 4.9 and a moisture of 6.3%.

f. 5 kg of corn starch with a moisture of 10.5% were slurried in 10 L of water and the pH was adjusted to 4.5 with dilute hydrochloric acid. 20.0 g (0.40% w/w) of glucoamylase (AMG 300 L) were added. The slurry was placed in a 53° C. water bath and allowed to react with constant stirring until the net sugar concentration as measured using a refractometer reached 7.1%. The pH was adjusted to 9.5 using 4% sodium hydroxide. The slurry was maintained at this pH and temperature for half an hour to deactivate the enzyme. The pH was then adjusted to 6.5 using a 25% solution of hydrochloric acid and spray dried using the procedure of Example 1b. The resultant starch had a dextrose equivalent of 26.2 and a moisture of 7.7%.

g. 20.0 kg of wheat starch with a moisture of 10.2% were slurried in 40 L of water and the pH was adjusted to 4.5 with dilute hydrochloric acid. 80 g of glucoamylase (AMG 300 L) were added. The slurry was placed in a 54° C. water bath and allowed to react with constant stirring until the net sugar concentration as measured using a refractomer reached 8.9%. The pH was adjusted to 9.5 using 4% sodium hydroxide. The slurry was maintained at this pH and temperature for half an hour to deactivate the enzyme. The pH was then adjusted to 6.5 using a 25% solution of hydrochloric acid and spray dried using the procedure of Example 1b. The resultant starch had a dextrose equivalent of 21.4 and a moisture of 3.9%.

Example 3

Starch Preparation with Acid or Heat Pre-Treatment a. 4 kg of potato starch were slurried in 8 L of sodium acetate buffer (20 mM, pH 4.5) and heated to 60° C. 10 g (0.25% w/w) of glucoamylase (AMG 300 L) were added and the reaction was allowed to proceed at 60° C. with constant stirring until the net sugar concentration reached 7%. The pH was then adjusted to 9.5 using 4% sodium hydroxide. The slurry was held at this pH and temperature for 30 minutes to deactivate the enzyme. The pH was then adjusted to 6.5 using dilute (25%) hydrochloric acid and spray dried as in Example 1b.

b. 1.0 kg potato starch was slurried in 2.5 L water and the pH was adjusted to 4.5 using dilute hydrochloric acid. The slurry was heated to 56° C. and held at that temperature for 30 minutes. 5 g of glucoamylase (AMG 300 L) were added and reaction was allowed to proceed at 56° C. with constant stirring until the net sugar concentration reached 5.2%. The temperature was lowered to 45° C. and the pH was adjusted to 9.0. The slurry was held at this pH and temperature for 30 minutes to inactivate the enzyme. The pH was then adjusted to 6.5.

Example 4

Preparation of Tomato-based Sauce (Hot Break)

| Ingredient | Control (wt %) | Experimental (wt %) |
|---|---|---|
| Water | 44.85 | 44.85 |
| Tomato Paste (hot break) | 25.00 | 25.00 |
| Sugar | 15.00 | 12.00 |
| Vinegar | 12.00 | 12.00 |
| Salt | 2.90 | 2.90 |
| Onion Salt | 0.10 | 0.10 |
| Celery Salt | 0.10 | 0.10 |
| White Pepper | 0.05 | 0.05 |
| Sample | 0.00 | 3.00 |

The following samples were used:

Sample 1=Corn Syrup Solid, 24 DE (FRODEX 24, commercially available from American Maize)

Sample 2=Maltodextrin, 5 DE (LODEX 5, commercially available from American Maize)

Sample 3=Corn Syrup Solid, 42 DE (STAR DRI 42R, commercially available from Staley)

Sample 4=Starch of Example 2d

Sample 5=Starch of Example 2e

Sample 6=Starch of Example 2b

Sample 7=Starch of Example 2f.

The water, tomato paste and vinegar were mixed and placed in a Koruma double jacketed steam kettle. The remaining ingredients were dry blended and added to the Koruma. The mixture was heated to 90° C. and held for 5 minutes. The hot mixture was homogenized using a two stage Homogenizer at 150 Bar. The hot mixture was then stirred down in a Hobart blender using speed 2 for 1 minute and the paddle for mixing. The hot mixture was used to fill jars and refrigerated at 4° C. for storage. The ketchups were evaluated organoleptically and for syneresis after 37 days storage with the following results:

Control—showed pulpiness and severe syneresis

Sample 1—no significant difference from control

Sample 2—more mouthfeel than control; no visible syneresis; thicker, shorter texture, and slightly more smooth in appearance. (Note: mouthfeel, as used herein, refers to a coated feeling on the tongue, heaviness, and a feeling of film on the pallet).

Sample 3—slightly thicker than the control, extremely pulpy, syneresis visible

Sample 4—opaque; moderately pulpy, no syneresis

Sample 5—significantly thick; opaque, but less so than Sample 4; no syneresis

Sample 6—no syneresis; a very short texture; pulpiness similar to control, but more mouthfeel Sample 7—less opaque than Sample 4; slightly more pulpiness than Sample 4; no syneresis Samples 1 and 3 have the highest pulpiness.

Samples 1, 2 and 3 all showed severe syneresis

The viscosity and consistency of each sample was measured using a Bostwick Consistometer and the standard methodology described in 21 CFR §155.194(b).

The temperature of the sample was adjusted to 20±1° C. as was the Bostwick trough. The end-to-end level of the Bostwick was adjusted by means of the spirit level placed in the trough of the instrument. The side-to-side level was adjusted by means of the built-in spirit level. The sample was then transferred to the dry sample chamber of the Bostwick, filling the chamber slightly more than level full and avoiding air bubbles. A straight edge is passed across the top of the chamber starting from the gate end to remove excess sample. The gate is released by gradual pressure on the lever, holding the instrument down at the same time to prevent movement as the gate is released. After 30 seconds, the maximum distance of flow was read. The results are listed in Table I below.

TABLE I

| | Bostwick @ 20° C. (cm) | | Bostwick @ 5° C. (cm) | |
|---|---|---|---|---|
| Sample | 24 hours | 1 week | 24 hours | 1 week |
| Control | 4.5 | 3.6 | 3.6 | 3.4 |
| Sample 1 | 3.9 | 4.3 | 3.7 | 3.8 |
| Sample 2 | 4.1 | — | 4.0 | 3.7 |
| Sample 3 | — | — | — | — |
| Sample 4 | 3.3 | 3.7 | 3.2 | 2.8 |
| Sample 5 | 2.9 | 2.7 | 2.8 | 2.3 |
| Sample 6 | 3.6 | 3.6 | 3.3 | 3.0 |
| Sample 7 | 3.7 | 4.0 | 3.2 | 2.9 |

As can be seen from Table I, the starches of the instant invention have a higher viscosity (lower Bostwick) than standards known in the art of comparable dextrose equivalents.

Serum separation of the ketchup samples, after being stored for 37 days, was measured by pouring off any serum and weighing the serum. The results are given below in Table II.

TABLE II

| Sample | Weight of Serum (g) | % Reduction |
|---|---|---|
| Control | 1.220 | — |
| 1 | 0.454 | 62.79 |
| 3 | 0.360 | 70.49 |
| 6 | 0.369 | 69.76 |
| 4 | 0.087 | 92.86 |
| 7 | 0.061 | 95.00 |

Example 5

Preparation of Tomato-Based Sauce (Cold Break)

| Ingredient | Control 1 (wt %) | Control 2 (wt.%) | Expt. 1 (wt %) |
|---|---|---|---|
| Water | 39.94 | 39.94 | 39.94 |
| Sugar | 15.00 | 15.00 | 11.20 |
| Hot Break Tomato | 30.00 | 0.00 | 0.00 |
| Cold Break Tomato | 0.00 | 30.00 | 30.00 |
| Starch | 0.00 | 0.00 | 3.80 |
| Vinegar 5% | 12.00 | 12.00 | 12.00 |
| Salt | 2.80 | 2.80 | 2.80 |
| Potassium Sorbate | 0.01 | 0.01 | 0.01 |
| Onion Salt | 0.10 | 0.10 | 0.10 |
| Celery Salt | 0.10 | 0.10 | 0.10 |
| Pepper | 0.05 | 0.05 | 0.05 |

Sample Starches

Expt. 1=Starch of Example 2d

The water, tomato paste, and vinegar were blended in a double jacketed steam kettle. The remaining ingredients were added and the mixture was heated to 90° C. The mixture was held at this temperature for five minutes and homogenized. Control 1 was homogenized at 200 bar and the remaining samples were "homogenized" without any pressure. The homogenized mixture was stirred down using a Hobart mixer equipped with a paddle at speed 2 for one minute. The mixture was jarred and refrigerated at 4° C.

After 72 hours, the samples were checked and the following results were observed:

Control 1—thick; severe serum separation

Control 2—very thin and liquid; slight serum separation

Expt. 1—heavy texture, no serum separation

Bostwick consistency was measured at various times and the results are shown in Table Ill.

TABLE III

| Sample | @ 72 hrs 5° C. (cm) | @ 7 days 5° C. (cm) | @ 7 days, 20° C. (cm) |
|---|---|---|---|
| Control 1 | 3.0 | 4.5 | 5.0 |
| Control 2 | 9.0 | 8.5 | 9.0 |
| Expt. 1 | 7.0 | 6.5 | 7.5 |

The present starches eliminate syneresis and provide a viscosity between that of hot and cold break controls. The viscosity of either control may be more closely matched by varying the amount of starch added.

Example 6

Preparation of Tomato Sauce

| Ingredient | Control | Expt. |
|---|---|---|
| Water | 65.02 | 63.52 |
| Tomato Paste | 30.00 | 30.00 |
| Olive Oil | 2.00 | 2.00 |
| Salt | 1.06 | 1.06 |
| Onion Powder | 0.19 | 0.19 |
| Sweet Basil | 0.09 | 0.09 |
| White Pepper | 0.08 | 0.08 |
| Oregano | 0.04 | 0.04 |
| Gariic Powder | 0.02 | 0.02 |
| 10 DE Maltodextrin | 1.50 | 0.00 |
| Starch Ex. 2a | 0.00 | 3.00 |

The water, tomato paste and olive oil were blended. The remaining ingredients were dry blended and added to the tomato mixture. The mixture was heated to 90.6° C. (195° F.). The resultant tomato sauce was hot filled into jars and refrigerated at 4° C. overnight. The sauce was then heated to 74° C. (165° F.) and Bostwick viscosity was measured for each sample at 15, 30, 45, and 60 seconds using the procedure previously described. The average of three readings are listed in Table IV below.

Bostwick viscosity was measured for each sample at 15, 30, 45 and 60 seconds using the procedure previously described. The average of three readings are listed in Table IV below.

TABLE IV

| Time(s) | Control | Expt. |
|---|---|---|
| 15 | 12.5 | 8.0 |
| 30 | 12.75 | 8.75 |
| 45 | 13.00 | 9.0 |
| 60 | 13.25 | 9.25 |

Example 7

Viscosity of Starch a. Hot Paste Viscosity Measurement

A slurry containing 5.0% starch on a dry weight basis was prepared and heated from 50° C. to 94° C. at a rate of 1.5° C. per minute. The slurry was then held at 94° C. for 10 minutes. Hot viscosity was measured while heating the paste in an RVA Series 4 Rapid Visco Analyzer (Newport Scientific, New South Wales, Australia).

b. Cold Paste Viscosity Measurement

The cooked paste from the hot paste viscosity measurement was cooled to 22° C. and held for 30 minutes. Using an RFS2-BD050 rheometer (Rheometrics, Piscataway, N.J.), viscosity was measured during a shear sweep from 0.1 to 100 $sec^{-1}$ at 22° C. Parallel plates of 25 mm diameter were used at a distance of 1.25% mm apart. Viscosity was compared at a shear of 10 $sec^{-1}$.

The hot and cold viscosity measurements are shown in Table V below.

TABLE V

| Starch | Hot Peak (cps) | Cold Peak (cps) |
|---|---|---|
| EX 2a | 439 | 68 |
| EX 2b | 342 | 138 |
| EX 2d | 105 | 172 |
| EX 2g | 98 | 118 |

Example 8

Preparation of Jam

| Ingredient | Control (wt %) | Experimental (wt %) |
|---|---|---|
| Frozen Strawberries | 45.00 | 45.00 |
| Pectin (AF 401) | 0.6 | 0.0 |
| Sugar | 53.20 | 56.0 |
| Water | 5.00 | 5.00 |
| Water removed | 6.20 | 6.20 |
| Starch | 0.0 | 3.00 |

Samples

Starch of Example 2b

The pectin, 70% of the sugar and the starch were mixed. The fruit and water were mixed separately and added to the dry ingredient mixture. The remaining sugar was added and the jam mixture was heated to 195° F. (90.6° C.) and held while stirring constantly. When Brix reached about 62°, the mixture was removed from heat and sufficient citric acid (50% solution) was added to adjust the pH to 3.0. The mixture was cooled to room temperature and filled into jars. The jars were stored at 4° C. for 24 days.

a. Sensory Evaluation

The control gave a short texture, high mouthfeel, and melted quickly. The experimental sample had an acceptable, non-cohesive mouthfeel and gave more film building than the control. The sample had the same sheen and transparency as the control and dispersed less.

b. Texture Analysis

The texture of the jams were measured using a Texture Analyzer TAXT2 (Stable Micro Systems). A 25 mm, 20° conical probe was used to determine the force needed to penetrate 20 mm using the following parameters:

speed to surface : 5 mm/sec
initial force : 10 g force
speed into sample : 0.8 mm/sec
depth : 20 mm
speed upwards : 0.8 mm/sec The results are listed below in Table VI.

TABLE VI

| Day | Experimental Sample Peak Force (g) | Control Peak Force (g) |
|---|---|---|
| 1 | 49.569 | |
| 6 | 53.423 | |
| 8 | 49.372 | |
| 10 | 48.817 | |
| 17 | 48.025 | 160.853 |
| 24 | 57.528 | 171.115 |

The sample gelled, gave a cuttable texture and a shiny, transparent appearance. Further, the sample controlled serum separation, gave a short texture and did not have any off-flavor.

We claim:

1. A viscosifier comprising an enzymatically-hydrolyzed, ungelatinized granular starch or flour with a dextrose equivalent of from about 5 to about 60.

2. The viscosifier of claim 1, wherein the starch or flour is hydrolyzed using an enzyme selected from the group consisting of $\alpha$-amylase, glucoamylase, and maltogenase.

3. The viscosifier of claim 2, wherein the starch or flour has a dextrose equivalent of from about 15 to about 35.

4. The viscosifier of claim 2, wherein the starch or flour has a dextrose equivalent of from about 20 to about 30.

5. A process for making a viscosifier which comprises:

a. slurrying a starch or flour in an aqueous medium at from about 10 to about 40% solids;

b. hydrolyzing the starch or flour to a dextrose equivalent of from about 5 to about 60 using an enzyme capable of hydrolyzing a granular starch or flour; and c. inactivating the enzyme.

6. The process of claim 5, further comprising recovering the starch or flour by drying.

7. The process of claim 6, wherein drying is accomplished by a method selected from the group consisting of drum drying, freeze drying, and spray drying.

8. The process of claim 5, wherein the enzyme is selected from the group consisting of $\alpha$-amylase, glucoamylase, and maltogenase.

9. The process of claim 5, wherein the starch or flour is hydrolyzed to a dextrose equivalent of from about 15 to about 35.

10. The process of claim 5, wherein the starch or flour is hydrolyzed to a dextrose equivalent of from about 20 to about 30.

11. A food composition comprising the starch or flour of claim 1.

12. The food composition of claim 11, wherein the food is vegetable or fruit-based.

13. The food composition of claim 12, wherein the food is a tomato-based product.

14. The food composition of claim 12, wherein the food is selected from the group consisting of a fruit prep, a jelly, a jam, a marmalade and a fruit pie filling.

15. A method of replacing tomato solids in a food composition comprising substituting the starch or flour according to claim 1 for a portion of the tomato solids.

16. A method of replacing pectin in a food composition comprising substituting the starch or flour according to claim 1 for at least a portion of the pectin.

17. A method of thickening a food composition comprising adding the viscosifier of claim 1.

* * * * *